United States Patent
Pedersen et al.

(10) Patent No.: US 11,391,267 B2
(45) Date of Patent: Jul. 19, 2022

(54) SYSTEM AND METHOD FOR HANDLING WIND TURBINE COMPONENTS FOR ASSEMBLY THEREOF

(71) Applicant: Vestas Wind Systems A/S, Aarhus N. (DK)

(72) Inventors: Gunnar K. Storgaard Pedersen, Skjern (DK); Christian Skov Frederiksen, Videbæk (DK); Anton Bech, Ciudad Real (ES); Gerner Larsen, Hinnerup (DK); Ivar J. B. K. Jensen, Hornslet (DK); Klaus Lynge Petersen, Skjern (DK)

(73) Assignee: Vestas Wind Systems A/S, Aarhus N (DK)

(*) Notice: Subject to any disclaimer, the term of this patent is extended or adjusted under 35 U.S.C. 154(b) by 175 days.

(21) Appl. No.: 16/621,293

(22) PCT Filed: Jun. 21, 2018

(86) PCT No.: PCT/DK2018/050155
§ 371 (c)(1),
(2) Date: Dec. 11, 2019

(87) PCT Pub. No.: WO2019/001664
PCT Pub. Date: Jan. 3, 2019

(65) Prior Publication Data
US 2020/0109698 A1    Apr. 9, 2020

(30) Foreign Application Priority Data

Jun. 30, 2017  (DK) .......................... PA 2017 70527

(51) Int. Cl.
*F03D 13/10*    (2016.01)
*B64C 39/02*    (2006.01)
(Continued)

(52) U.S. Cl.
CPC ............ *F03D 13/10* (2016.05); *B64C 39/022* (2013.01); *G05D 1/104* (2013.01); *G08G 5/0069* (2013.01);
(Continued)

(58) Field of Classification Search
None
See application file for complete search history.

(56) References Cited

U.S. PATENT DOCUMENTS 9,022,324 B1 *  5/2015  Abhyanker .......... G08G 5/0013
                                                        244/190
9,205,922 B1 * 12/2015  Bouwer ................. B64C 37/02
(Continued)

FOREIGN PATENT DOCUMENTS

CN      204342266 U     5/2015
CN      205633032 U    10/2016
(Continued)

OTHER PUBLICATIONS

Danish Patent and Trademark Office, Search and Examination Report in PA 2017 70527, dated Dec. 19, 2017.
(Continued)

*Primary Examiner* — Adam D Tissot
*Assistant Examiner* — Garrett F Evans
(74) *Attorney, Agent, or Firm* — Wood Herron & Evans LLP (57) ABSTRACT

A method of handling a wind turbine component for assembly or maintenance, comprising moving one or more unmanned air vehicles to respective positions proximal to a wind turbine component so that the wind turbine component can be supported by the one or more unmanned air vehicles; and controlling the one or more unmanned air vehicles to lift the wind turbine component and manoeuvre said component with respect to a wind turbine. The invention extends to a
(Continued)

system for handling a component of a wind turbine, comprising a plurality of unmanned air vehicles (UAVs); a UAV ground station computer system; and one or more lifting harnesses for carrying by the plurality of unmanned air vehicles.

23 Claims, 9 Drawing Sheets

(51) Int. Cl.
 *G05D 1/10* (2006.01)
 *G08G 5/00* (2006.01)
(52) U.S. Cl.
 CPC .. *B64C 2201/027* (2013.01); *B64C 2201/128* (2013.01); *B64C 2201/146* (2013.01)

(56) References Cited

U.S. PATENT DOCUMENTS

| | | | |
|---|---|---|---|
| 9,305,280 B1 | 4/2016 | Berg et al. | |
| 9,676,481 B1 | 6/2017 | Buchmueller | |
| 2005/0061910 A1* | 3/2005 | Wobben | B64C 39/022 244/17.23 |
| 2011/0084162 A1* | 4/2011 | Goossen | B64D 1/22 244/135 C |
| 2012/0085864 A1* | 4/2012 | Kirt | B64B 1/06 244/137.2 |
| 2014/0231590 A1* | 8/2014 | Trowbridge | G08G 5/0039 244/175 |
| 2015/0158576 A1 | 6/2015 | Jones et al. | |
| 2016/0138561 A1* | 5/2016 | Hoffmann | F03D 13/10 29/889.21 |
| 2016/0207627 A1 | 7/2016 | Hoareau et al. | |
| 2016/0362180 A1 | 12/2016 | Priest | |
| 2017/0043872 A1 | 2/2017 | Whitaker et al. | |
| 2017/0144757 A1* | 5/2017 | Hall | G06F 3/04847 |
| 2017/0291707 A1* | 10/2017 | Veronesi | B66C 23/18 |
| 2018/0046181 A1* | 2/2018 | Lai | G08G 5/045 |
| 2019/0383275 A1* | 12/2019 | Pubanz | F03D 15/20 |
| 2020/0180763 A1* | 6/2020 | Schütz | B64C 39/024 |

FOREIGN PATENT DOCUMENTS

| | | |
|---|---|---|
| DE | 102012010019 A1 | 11/2013 |
| EP | 2272754 A1 | 1/2011 |
| EP | 2881324 A1 | 6/2015 |
| WO | 2015193742 A1 | 12/2015 |
| WO | 2017078044 A1 | 5/2017 |
| WO | 2017110743 A1 | 6/2017 |

OTHER PUBLICATIONS

European Patent Office, International Search Report and Written Opinion in PCT Application No. PCT/DK2018/050155, dated Sep. 19, 2018.

China National Intellectual Property Administration, First Notification of Office Action in CN Application No. 201880043535.3, dated Jul. 8, 2020.

China National Intellectual Property Administration, Decision of Rejection in CN Application No. 201880043535.3, dated Nov. 2, 2021.

\* cited by examiner

SYSTEM AND METHOD FOR HANDLING WIND TURBINE COMPONENTS FOR ASSEMBLY THEREOF

FIELD OF THE INVENTION

This invention is directed to the assembly and disassembly of components of a wind turbine.

BACKGROUND OF THE INVENTION

Wind turbines are large structures which comprise many heavy components such as generating equipment, tower segments, wind turbine blades and so on.

Known approaches for assembling wind turbines typically involve the use of heavy lift plant equipment such as cranes to lift the large and heavy wind turbine components into the correct position so that they can be connected together. Similarly, heavy lift equipment also needs to be brought in for many maintenance tasks associated with a wind turbine. For example, in the unlikely event that a blade bearing is found to be defective, then a crane would need to be brought into position. Using a suitable supporting sling, the crane can then remove the blade from the hub once maintenance personnel have detached the blade.

These known approaches to handling wind turbine components are manual in nature and involve the use of large-scale plant equipment together. Numerous technicians are required to control that equipment and to provide close-quarters support to guide the wind turbine components into position. These methods can be inefficient and potentially dangerous for the technicians involved.

It is against this background that the embodiments of the invention have been devised to provide improved, more efficient, safe, and cost effective approaches for handling wind turbine components for the purposes of assembly and maintenance.

STATEMENT OF INVENTION

In one aspect, the embodiments of the invention provide a method of handling a wind turbine component for assembly or maintenance, the method comprising moving one or more unmanned air vehicles to respective positions proximal to a wind turbine component so that the wind turbine component can be supported by the one or more unmanned air vehicles; controlling the one or more unmanned air vehicles to lift the wind turbine component and manoeuvre said component with respect to a wind turbine.

The invention extends to a system for handling a component of a wind turbine, comprising a plurality of unmanned air vehicles (UAVs); a UAV ground station computer system; and one or more lifting harnesses for carrying by the plurality of unmanned air vehicles.

Each of the unmanned air vehicles supports the component by way of a respective support line by which means the unmanned air vehicles are able to support the mass of the component and lift it into the air. The support lines may support the component directly in the sense that they are connected between the component and a unmanned air vehicle, or indirectly in the sense that they may connect between the component and an intermediate lifting device such as a yoke or frame. The lifting lines may be any kind of harness suitable for coupling to and support the component.

In one embodiment, a pair of unmanned air vehicles may be attached to a respective support line.

In another embodiment, each of the unmanned air vehicles may be attached to a lifting yoke, which is in turn attached to the component by one or more support lines.

The support lines may be ropes or cables that attach to dedicated lifting points on the blade, but in other embodiments the support lines may be in the form of slings that run underneath the component. Advantageously, this avoids the need to directly attach support lines into the blade surface and may provide a useful frictional interface with the blade to control its position.

Usefully, in some embodiments, the relative positions of the unmanned air vehicles may be coordinated so that the wind turbine component is lifted in a predetermined orientation. This may extend to an operator providing control commands to define the (altitude, horizontal, and attitude) position of a point of the blade and to define a particular orientation of an axis of the component, wherein those control commands may be suitably interpreted by a control system to control the drones accordingly to meet the operator-defined control objective.

One of the unmanned air vehicles is designated a master vehicle, the other unmanned air vehicles being slave vehicles, whereby the relative positions of the slave vehicles are coordinated with that master vehicle. In this way, therefore, the master vehicle becomes the focus of the control commands, whereas the slave vehicles position themselves in accordance with a predetermined rule with respect to that master vehicle. In one embodiment, two master vehicles may be configured, wherein the relative positions of the slave vehicles are distributed between the master vehicles.

In these embodiments, therefore, the operator of the system need only concern themselves with the position of the master vehicle or vehicles, whilst the slave vehicles position themselves automatically by control signals sent to them by the master vehicles.

The coordination of the relative positions of the unmanned air vehicles may be based on a differential GPS system.

The unmanned air vehicles may be aligned in a linear array during a lifting manoeuvre.

The embodiments of the invention are particularly useful at lifting and positioning heavy components such as wind turbine blades, but they may also be used to handle other wind turbine components such as replacement electronic modules, tool packages, gearbox components, sensor packages, and so on.

In order to ensure accurate positioning of the component with respect to the wind turbine, the method may further include guiding the component to the wind turbine using a guidance system. That guidance system may be an optical guidance system, a radar-based guidance system or a lidar based guidance system, by way of example.

The guidance system is operable to provide data/information to the drones regarding the relative position of the wind turbine component with respect to the wind turbine to accurate positioning and docking of the component. More specifically the drones orient the component in space, i.e. x,y,z position but also the direction of the centreline of the component in relation to the wind turbine component based on input from the guidance system. The component may therefore be guided precisely during the final stages of docking between the component and the wind turbine. Here the components are in close proximity and the risk of impact is therefore high, which require precise manipulation of the drones during this stage.

Provisions may be made to reduce the load that needs to be carried by the unmanned air vehicles and also increase the operational time of those vehicles.

In one embodiment, the method may include providing power to the one or more unmanned air vehicles by way of a tether system including at least one umbilical.

Providing power to the unmanned air vehicles via a tether systems means that the vehicles are not constrained by portable power systems which increases their payload capacity. In one embodiment, a first end of the umbilical is supported at a position above the ground. Beneficially, this reduces the length of the umbilical that is required to connect to the unmanned air vehicle, thereby reducing its mass.

The first end of the umbilical can be supported at a position above the grounds by various means. One approach is to support the first end of the umbilical on a component of the wind turbine, for example the tower of the nacelle. It could also be supported on a dedicated tower or mast. In other embodiments, the first end of the umbilical may be supported at a position which is at a variable height about the ground. This may be achieved through the use of a variable-height mast, for example an inflatable or telescopic mast. It could also be achieved by supporting the umbilical using one of the unmanned air vehicles.

That unmanned air vehicle may then be configured to provide power to one or more of the unmanned air vehicles. In one embodiment the unmanned air vehicle has a power connection to providing power to several unmanned air vehicles. Beneficially, this means that the unmanned air vehicle that supports the umbilical can carry the mass of that umbilical and can then feed power to the other unmanned air vehicles, thereby acting as a power hub. This enables the further umbilicals connected to the other unmanned air vehicles to be lighter-weight because they do not need to provide such a high power delivery.

BRIEF DESCRIPTION OF THE DRAWINGS

The invention will now be described by way of example with reference to the accompanying drawings, in which.

DETAILED DESCRIPTION OF EMBODIMENTS

Embodiments of the invention provide unmanned aircraft systems (UAS) and unmanned air vehicles (UAV) or drones, in order to provide an efficient approach to handle wind turbine components to aid wind turbine assembly and maintenance. The embodiments of the invention will be described in the context of that component being a wind turbine blade, although it should be noted that this is meant simply as an example and the method and systems of the invention may be used to handle other wind turbine components, suitable adapted where necessary and appropriate. For brevity, this discussion will refer to a 'drone' as any type of unmanned air vehicle, be it a relatively small-scale rotorcraft such as a multirotor, for example a tricopter, quadcopter, pentacopter, hexacopter, octocopter or a larger-scale unmanned helicopter.

In general the embodiments of the invention provide a novel approach for handling components in which drones are used to lift components of a wind turbine for assembly, disassembly or maintenance purposes. In principle a single drone may be used for this purpose, which may be a single heavy-lift drone, such as a remote controlled helicopter, for lifting a relatively heavy component such as gearbox or converter components and the like, or even a drone such as a multirotor having a lower lift capacity, which may be particularly suited to lifting small components such as electronic units or tool packages up to the working height of the wind turbine nacelle to supply maintenance workers with the right provisions for the job in hand. However, the concept extends to a plurality of drones, working together in cooperation to lift a heavy load to the required position and in the correct orientation.

Figure 1:
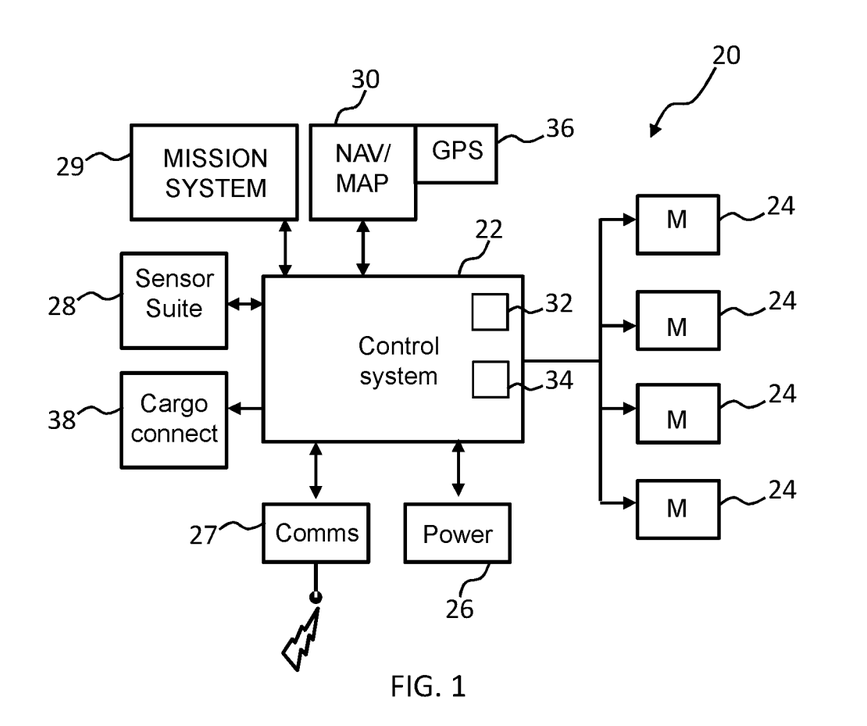
FIG. 1 is a schematic diagram of an exemplary unmanned air vehicle system for use in the embodiments of the invention.

To put the invention into context, FIG. 1 illustrates a system diagram of a typical architecture of a drone platform 20 which may be used in the implementation of the embodiments of the invention. In overview, the drone 20 includes: a control system 22, one or more propulsion units 24, a power system 26, a communication system 27, a sensor suite 28, mission planning system 29 and a navigation system 30. The drone system 20 may be operated in conjunction with a ground-or base-station computer system 31, hereinafter referred to as the 'ground-station', which will be described in more detail later with reference to FIG. 2.

The control system 22 is the main computing unit that controls the flight of the drone 20 by controlling the propulsion units 24 based on inputs from the sensor suite 28 and navigation system 30. The control system 22 may implement remote control flight based on received control inputs from a ground based controller, autonomous flight, based on its internal mission planning algorithms, or semi-autonomous flight, in which a blend of on-board mission planning and ground based direction are used. The main responsibility of the control system 22 is as a lower layer controller which is responsible for positional control of the drone (altitude and lateral position), attitude control (pitch, roll and yaw), and velocity control (horizontal and vertical speed) based on remote control actions or based on self-generated flight directions. The control system 22 comprises a suitable processing environment having a processor 32 and a memory 34 with associated on-board communications functionality, such as a data bus, so it is able to communicate with other on-board systems.

To directly control the flight profile the control system 22 communicates with the one or more propulsion units 24. Four propulsion units 24 are shown here, as would be consistent with the drone system 20 being a multirotor. However, more or fewer propulsion units are also appropriate. For example an autonomous helicopter may have a single propulsion unit. The propulsion units may be any suitable units for providing controllable flight for the drone, and may be electric motors driving suitable rotor blades, as are typical with multirotor of varying size and lift capacities. However, the propulsion units 24 may also be gas turbines or internal combustion engines, for example.

The on-board power system 26 is selected to be suitable for the propulsion units 24. For example, for electric motors the on-board power system 26 may be a battery pack, a fuel cell, or even an external power plug so as to receive electrical power from an external source. Conversely, the power system 26 could be an on-board fuel tank in the event that the propulsion units are gas-turbines or ICEs.

The communication system 27 provides the means to send and receive data to and from systems that are external to the drone 20. For example, the drone 20 may send telemetry data to the base station 31, and may send positional, attitude and velocity data to other drones operating in the area, either as part of a drone swarm or operated independently. The communication system 27 may also receive data from external systems, and in this context it may receive remote control commands from the base station if the drone 20 is operated in remote control flight mode. Alternatively it may upload mission data from the base station. The communication system 27 also permits incoming and outgoing communication with other drones so that flight paths and mission objectives can be coordinated with them to achieve a collective goal. The communication system may direct signals by any means known in the art including, but not limited to, cellular or other phone-based networks, over remote control radio frequency links, UHF or L-band frequency links, microwave frequency links, or other appropriate datalinks, networks, or communication paths.

The sensor suite 28 is operably connected to the control system 22 and provides appropriate sensor data to assist with the operation of the drone. For example, the sensor suite may comprise proximity detectors, a global navigation satellite system/global positioning system (GNSS/GPS) unit for positioning control, optical still and video cameras for carrying out inspection and guidance tasks, inertial navigation systems to name a few examples. Typically such a sensor suite 28 would be adaptable to carry more or fewer sensors as required for a particular task. Note that in this context the GPS unit may receive signals directly from satellites in order to fix the position of the drone, although another option would be to implement a differential GPS system (known in the art) which receives signals from a ground-based differential GPS beacon in order to provide a higher positional accuracy compared to direct GPS. Note that a GPS unit 36 is shown here as integral with the navigation system 30.

Mission planning system 29 provides a link to the base station to store missions that have been generated thereon and to which the drone follows in use. The mission planning system 29 may include suitable memory storage and algorithms to store, provide and generate on the fly appropriate mission objectives, waypoints, operational envelopes and so on.

Navigation system 30 provides control inputs to the flight control system 22 regarding path following based on input from GPS data from the sensor suite 28.

In addition to the operational systems described above, the drone 20 also includes a cargo connection 38 to provide a releasable connection to a cargo so that the drone may be connected to and released from a cargo either by an operator or by an electronically controlled hook, for example. The sensor suite 28 may include a suitable load sensor to detect properties of the cargo such as its mass and load bias/centre of gravity.

Figure 2:
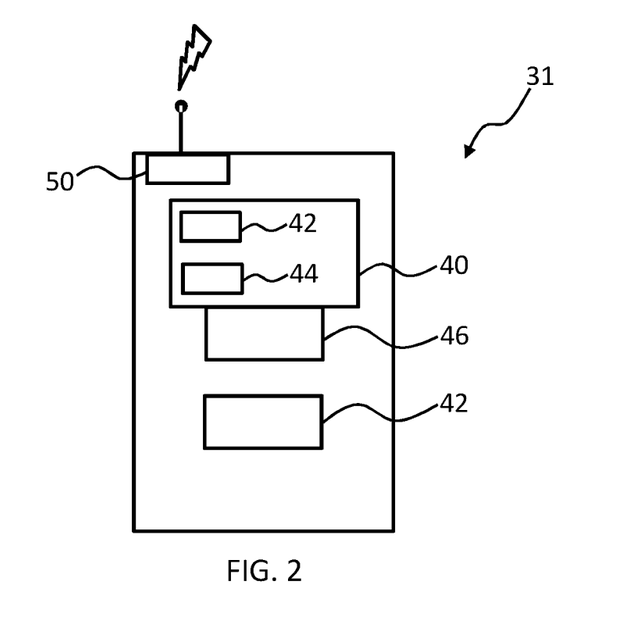
FIG. 2 is a schematic diagram of a ground station for use with the drone system of FIG. 1.

Having described the functional components of the drone 20, discussion will now turn to the ground station 31 as shown in FIG. 2. Ground station 31 provides a ground-based control hub for the one or more drones 20 and is suitable equipped with a computing platform 40 having an appropriate processing module 42 and memory storage 44. The computing platform implements a suitable ground station software package 46 to provide appropriate ground station facilities for controlling and coordinating the one or more drones. For example, the software package may include telemetry feeds, status information updates, first person visual (FPV) feeds, mission planning interfaces and algorithms and so on. A user interface 48 is provided to enable to a user/operator to view data relating to the drone system and to input control and parameter data into the ground station. The user interface 48 may comprise of a display screen and audio output, and a user input means such as a keyboard, joystick, mouse, on-screen buttons or a combination of these. The ground station also has a communications system 50 in order to send data to and receive data from the one or more drones.

It should be appreciated that the above description of a drone system 20 is intended as merely an example of the main components of an autonomous air vehicle and that other components may also be included in a typical system. In general, it should be noted that drones for use in the embodiments of the invention are known and are able to perform in remote control flight modes, semi- and fully-autonomous flights modes, and are able to carry out manoeuvres in a coordinated fashion in fixed positional relationship with other drones.

A suitable type of drone is the Griff series of drones from Griff Aviation.

The above discussion focuses on an example of a drone system which may be used to give the invention context. The discussion will now focus on particular functionality of the drone system.

Figure 3:
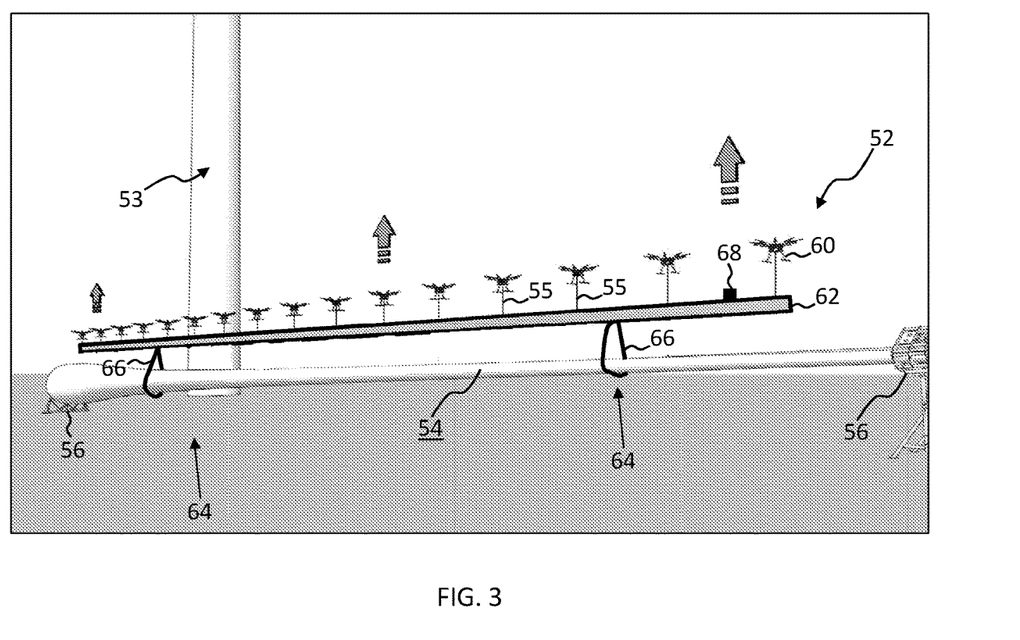
FIG. 3 is a diagram that illustrates a process for handling a wind turbine component in accordance with an embodiment of the invention.

FIG. 3 shows an embodiment of the invention in which a plurality of drones 52 are being used to lift a wind turbine blade 54 of a wind turbine 53, the tower of which can be seen in the background of the Figure. Each of the drones 52 may have a system levels architecture like that described above. The drones may be deployed from a mobile base such as a truck or boat with the appropriate control and recharging facilities for the drone swarm. The ground station 31 may be stationed on the mobile base. Here, the drones are shown as having been deployed and moved to respective positions proximal to the wind turbine blade 54 and are shown as supporting the blade 54 above the ground by way of a support system comprising respective support lines 55 (only two of which are shown for clarity), together with ground-based blade supports 56.

In order to lift the blade 54, in this embodiment the drones 52 must be controlled in a coordinated way to generate the required lifting force to get the mass of the blade 54 airborne. One way in which this could be achieved is by way of a manual process in which an operator controls the positioning of the drones 52. An operator-per-drone approach would be impractical in this embodiment, so in a manual process one of the plurality of drones 52 may be designated as a 'master drone' whilst the other units would be designated as 'slave drones'. The operator would therefore concentrate on positioning the master drone in the correct position and orientation with respect to the blade whilst the other drones would automatically position themselves at predetermined relative positions with respect to the master drone—note that the master drone is indicated here at 60.

More than one drone of the drone swarm may be designated a master drone. For example, it is envisaged that in a linear flight formation of drones the first and last drones in a line could be designated as master drones. In this way, the position of the two master drones could be controlled directly, whilst the positions of the slave drones could self-regulate into graduated or distributed positions between the two master drones. In such a master-slave relationship, the master drone or drones would be configured to send flight information to the slave drones via a suitable data feed signal (including height data, velocity data, horizontal position data).

It is envisaged that the subject of control could be the orientation and position of the component that is lifted. For example the parameters that are the subject of the control could be the position of the blade root and the orientation/attitude of the centreline of the blade. The drones could therefore acts in a coordinating flight regime in order to control the centreline and the blade root position in accordance with commands sent by an operator. In effect, therefore, the drones and the component are operably connected to represent a single remote controlled air system, such that the operator simply has to concentrate on the positioning of the component and the ground station 31 or the drones themselves carry out the interpretation of the operator comments in order to control each of the drones to achieve that objective.

Instead of manual control, the drones 52 are also controllable automatically by the ground station 31 on the basis of a predetermined mission profile. This would instruct the drones about the load they are to carry and the flight formation or pattern that is required. For example, for a linear-shaped load, such as a wind turbine blade, the optimum flight pattern would be that the drones are arranged in a line, as shown in FIG. 3. However, for other components, for example a gearbox, another flight pattern might be more appropriate, for example a square or circular arrangement.

The drones 52 are able to be connected directly to the blade in order to lift it, or they may be attached to an intermediate lifting device. In FIG. 2, the drones 52 are attacked to a lifting frame 62 or 'yoke'. In such an embodiment, the drones would first have to be coupled to the lifting yoke 62 before being commanded to position themselves over the blade 54.

Advantageously, the lifting yoke 62 would average out the upwards force applied by the individual drones 52 on the blade and improve control. The drones may be connected to the lifting yoke 62 by any suitable ropes, cables or chains. Usefully, however, relatively light-weight lifting lines may be coupled between the drones 52 and the lifting yoke 62 which simplifies the connections needed between those components.

A lifting harness 64 is then coupled between the lifting yoke 62 and the blade 54. In the Figure, the lifting harness 64 is embodied as first and second slings 66, each of which loop about the blade at respective positions towards the tip and root of the blade. The positions of the slings 66 are selected to provide a balanced lift so that the blade 54 remains at a predetermined orientation as it is lifted into the air. Preferably the blade 54 remains straight and level, although that is not essential. The lifting yoke 62 may be equipped with a sensor 68 to detect the orientation of the yoke 62 and provide a feedback path to the drone swarm so that the correct positioning and orientation can be maintained. Generally, the lifting lines, ropes, cables, webbing, or other material that is either used to lift the wind turbine blade directed as attached to drones or via an intermediate lifting yoke, can hereby be considered to be lifting harnesses or blade holding means/devices. Note that the sensor 68 could also be positioned on the component to provide direct feedback of the position of the component.

The lifting slings 66 may be made of any suitable material, but one option is a relatively wide woven nylon webbing material which is able to spread the load of the blade across a wide enough contact patch so as to avoid damaging the blade. The webbing could advantageously be provided with a high friction surface material that improves the ability of the sling to maintain its position on the blade even when subject to a laterally directed force. However, when the drones operate to control the position of the blade, they become less sensitive to their actual position as they would be provided with a continuous feedback that would make them less sensitive to their position along the blade, for example if one drone changes position the other drones will help to compensate accordingly. Although two lifting slings are shown in FIG. 3, more lifting slings may be provided.

As a variant on the approach of attaching the support lines to the wind turbine blade directly, an alternative embodiment includes a tube-like lifting sock or sheath into which the blade can be received. Support lines can then be attached to the lifting sock by which means the drone swarm 52 is able to lift the blade into the air.

Once the drones 52 are coupled to the wind turbine blade 54, the drones may then lift the component upwards. This action may be in response to an operator either controlling the drones 52 manually, or it may also be achieved by an operator triggering a 'lift and position' portion or phase of a mission profile in which the drone swarm lifts the component and positions it relative to the wind turbine in order that it may be fixed into position.

Figure 4:
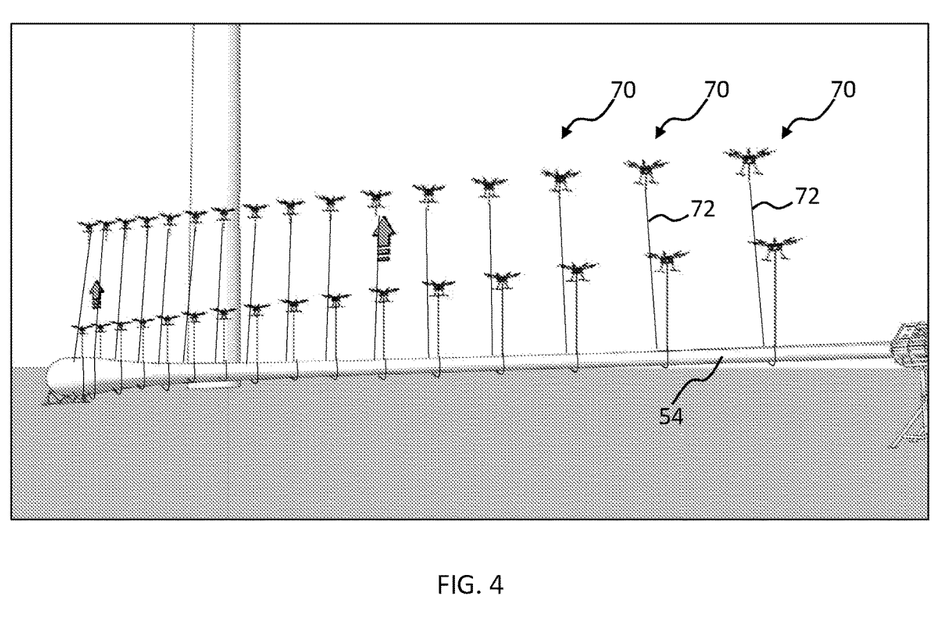
FIG. 4 is a diagram that illustrates a process for handling a wind turbine component in accordance with another embodiment of the invention.

In the above scenario, the drone swarm 52 is configured to perform a coordinated lifting manoeuvre on a blade 54, and this is achieved through the use of a lifting yoke 62 which acts as an intermediate component between the drones 52 and the blade 54. An alternative configuration is shown in FIG. 4, in which the drone swarm 52 arranged in pairs. In this embodiment, each drone pair 70 has a support line or lifting sling 72 connected between them such that the lifting sling 72 runs underneath the blade 54 to support it.

As discussed above, FIGS. 3 and 4 show two example approaches of how a drone swarm 52 could be controlled and configured with respect to a wind turbine component, in this case a wind turbine blade, in order to lift it off of the ground. Focus will now turn to FIGS. 5 and 6 which show a subsequent part of the process in which the wind turbine component is brought into a position relative to a wind turbine, in which position the wind turbine component can be attached to the wind turbine.

Figure 5:
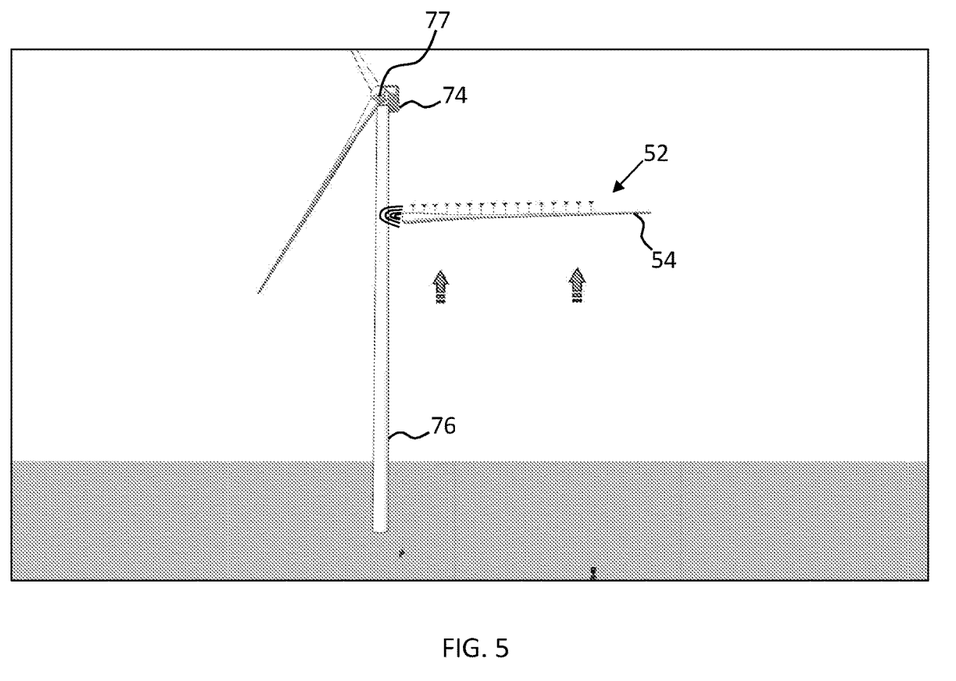
FIGS. 5 and 6 illustrate further how a wind turbine component can be assembled onto the wind turbine.
Figure 6:
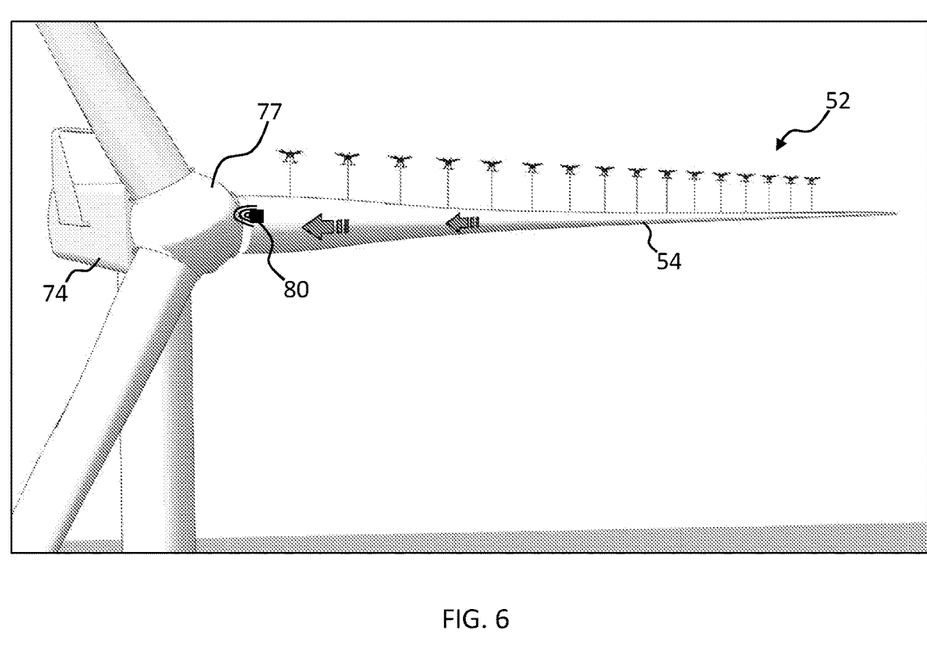

In FIG. 5, the drone swarm 52 is lifting the wind turbine blade 54 upwards towards a nacelle 74 of a wind turbine 76. As can be seen in the figure, the wind turbine 76 is a typical horizontal-axis wind turbine (HAWT) in which the nacelle 74 includes a hub 77 that supports a three-bladed rotor 78, as is a common configuration. The hub 77 has two blades attached to it, and is set into an angular position where it can receive the third blade 54, which is being lifted by the drone swarm 52, in a horizontal orientation.

The positioning and flight control of the drone swarm 52 may generally be achieved using GNSS/GPS technology, although to ensure the positional accuracy required it is currently envisaged that a differential GPS system will be preferred. Differential GPS technology would be well-understood by the skilled person. Although such a system may be adequate on its own to enable the drone swarm 52 to position the blade 54 next to the hub 77 in the correct position so that the blade root is directly adjacent the root socket of the hub, further guidance may be useful. Thus, in the embodiments of FIGS. 5 and 6 the system comprises a guidance system 80 which is operable to provide data/information to the drones 52 regarding the relative position of the wind turbine component 54 with respect to the wind turbine to accurate positioning and docking of the component.

Figure 7:
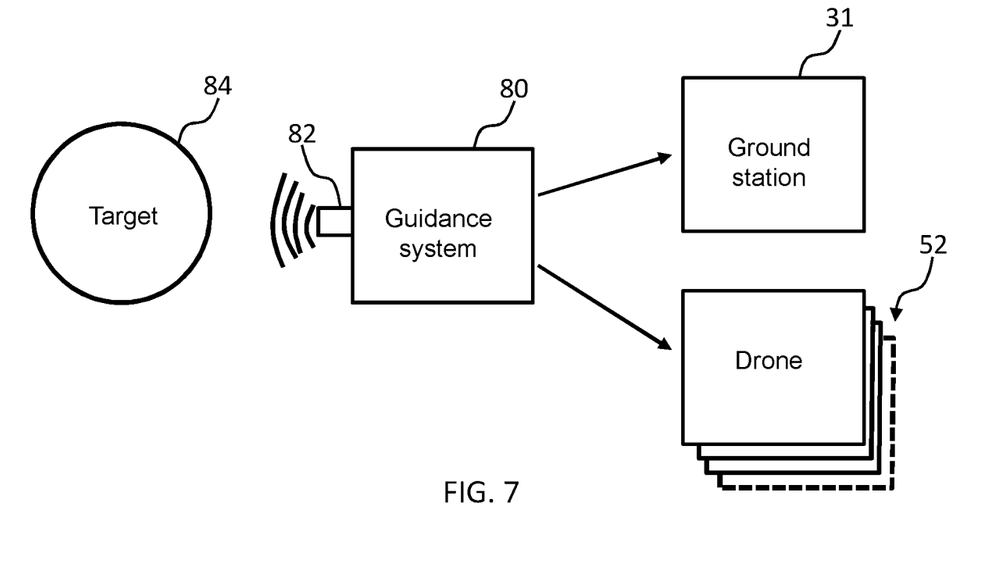
FIGS. 7 and 8 are schematic views of guidance systems for use with the unmanned air vehicle system of the embodiments of the invention.

The guidance system 80 may be embodied in various ways. Referring to FIG. 7, in one embodiment the guidance system 80 may include a radar transceiver 82. The radar transceiver 82 may be attached to the blade and oriented to point towards the hub 77 of the nacelle 74 so that it views the circular blade root socket on the hub 77 as a target 84. The guidance system 80 will have an appropriate knowledge database to recognise the shape of the hub and provide flight path information to the drone swarm 52 and/or the ground station 31 so that the drones are able to position themselves appropriately. Instead of radar, a lidar (Light Detection and Ranging) based guidance system is also considered to be appropriate.

As an alternative to the above approach, the radar transceiver 82 may instead be positioned in the hub 77 such that the root of the wind turbine blade is the target 84. The guidance system 80 will transmit guide path information to the drone swarm 52 either directly or via the ground station 31, in order to guide the wind turbine component into position.

Figure 8:
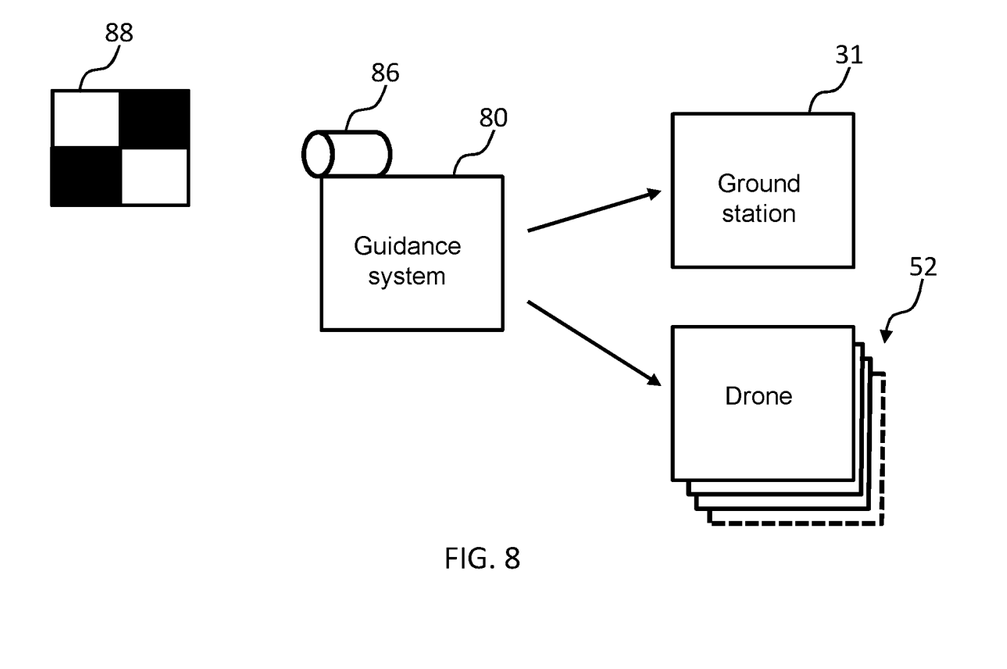

FIG. 8 shows a further alternative embodiment in which the guidance system 80 includes an optical camera 86. The optical camera 86 may be positioned on the blade 54 or in the hub 77 and may be configured to view an appropriate optical target 88. The guidance system 80 therefore is able to recognise the optical target 88 and derive information about the relative distance and orientation of the target in order to provide the drone swarm 52 and/or the ground station 31 with suitable guide path information so that the drone swarm is able to guide the wind turbine component into the desired position.

In the embodiments described above, it will be appreciated that the wind turbine components may represent significant loads for the drones to lift into the air. Relatively small tool packages and components such as electronics units and the like may be suitable for lifting with one or a small number of relatively low-capacity drones able to lift a few 10s of kg. Larger components may require one or two very high lift capacity unmanned air vehicles such as remote controlled heavy lift helicopters or, alternatively, a high number of industrial-grade multirotors, for example quadcopters, pentacopters, hexacopters, octacopters, etc.

Figure 9:
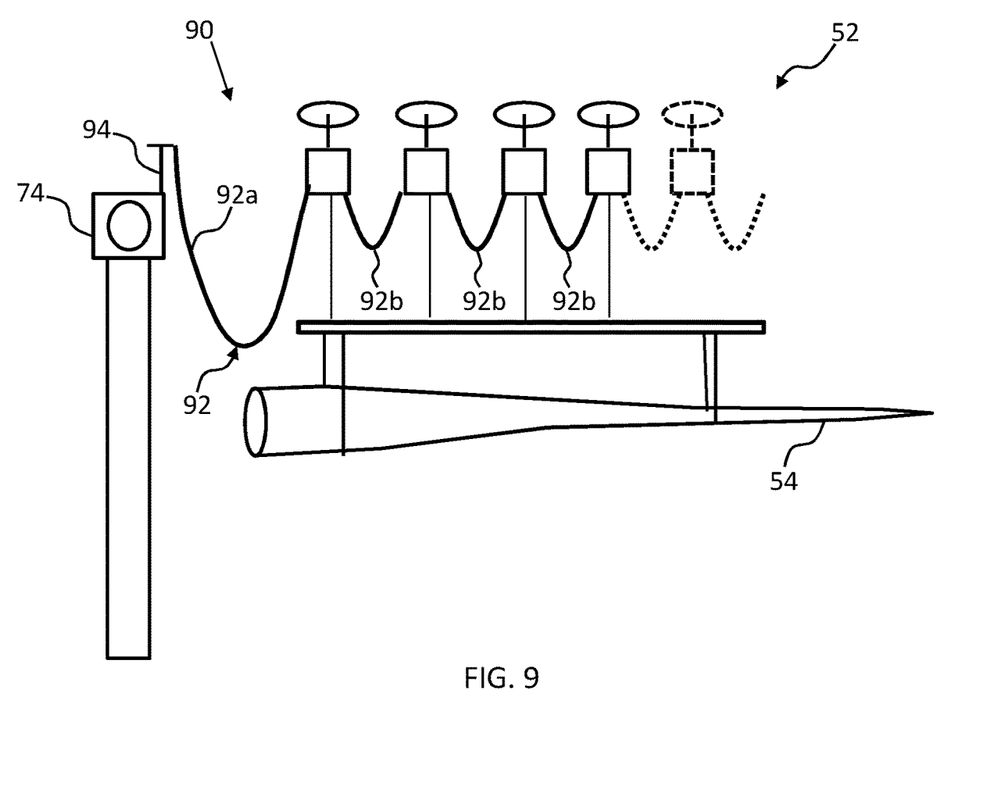
FIG. 9 is a diagram that illustrates further how a wind turbine component can be handled by a plurality of unmanned air vehicles.

The mass of wind turbine components that need to be lifted can easily exceed 1 tonne, and may approach 10 tonnes or more, which would require a relatively large number of multirotor type unmanned air vehicles in order to lift said components safely and reliably, allowing for failure of individual drones for example. It follows that the power requirements for such an operation would be significant, and a way of extending the flight time endurance of drones in such a lifting scenario would be desirable. FIG. 9 illustrates an embodiment that provides a solution to this issue. The same reference numerals will be used to features that are common with earlier figures, for simplicity.

In FIG. 9, a wind turbine component, in this case a wind turbine blade 54, is being lifted towards the nacelle 74. In order to provide the drone swarm 52 with increased flight time, a tether system 90 is provided. The tether system 90 is configured principally to provide power to the drones in the drone swarm 52 but may also convey data to and from the drone swarm 52 if appropriate.

The tether system 90 comprises umbilicals 92 that provide a power connection to each of the drones. A first umbilical 92a has a first end 93 connects between a power plug 94 provided on the nacelle and a first one of the drones 52. Other umbilicals are connected between neighbouring drones.

Since the power plug is supported in an elevated position on the wind turbine nacelle 74, the mass of the umbilical that needs to be carried by the drone connected to it can be reduced, which increases the payload capacity of the drone. The umbilical can be provided on a spool or drum to dispense out or retract back in, in dependence on the flight of the drone.

Note that the power plug 94 need not be provided on the nacelle 74, and it could be provided in an above ground position by other means. For example the power plug could be provided at the top of a mast. The mast could be configured to provide a variable height—for example it could be inflatable or telescopic.

In the FIG. 9 embodiment, the first drone that is connected to the power plug 94 is configured to provide power to another drone by way of a second umbilical 92b which is connected to a power plug 98 on the drone. The same configuration is used to 'daisy chain' umbilicals between neighbouring drones in the flight formation. As an alternative to this configuration, the first drone may provide a plurality of power connections for the other drones in the swarm and thereby acts as a power hub. Of course, multiple power hub drones may be provided to increase the number of drones that may be supplied with power.

The power plug 94 installed on the wind turbine may be provided with power from a dedicated power supply unit, or it may make use of the power converter system of the wind turbine which has been suitably adapted for the task to draw power from the grid. In an alternative embodiment in which the drones are not electrically powered, but powered by way of internal combustion engines such as gas turbines or reciprocating piston engines, the power supply may be a source of liquid fuel and the umbilicals may carry that liquid fuel to the drones. The advantage of this is that the drones do not have to be equipped with a heavy fuel tank for increased endurance.

Figure 10:
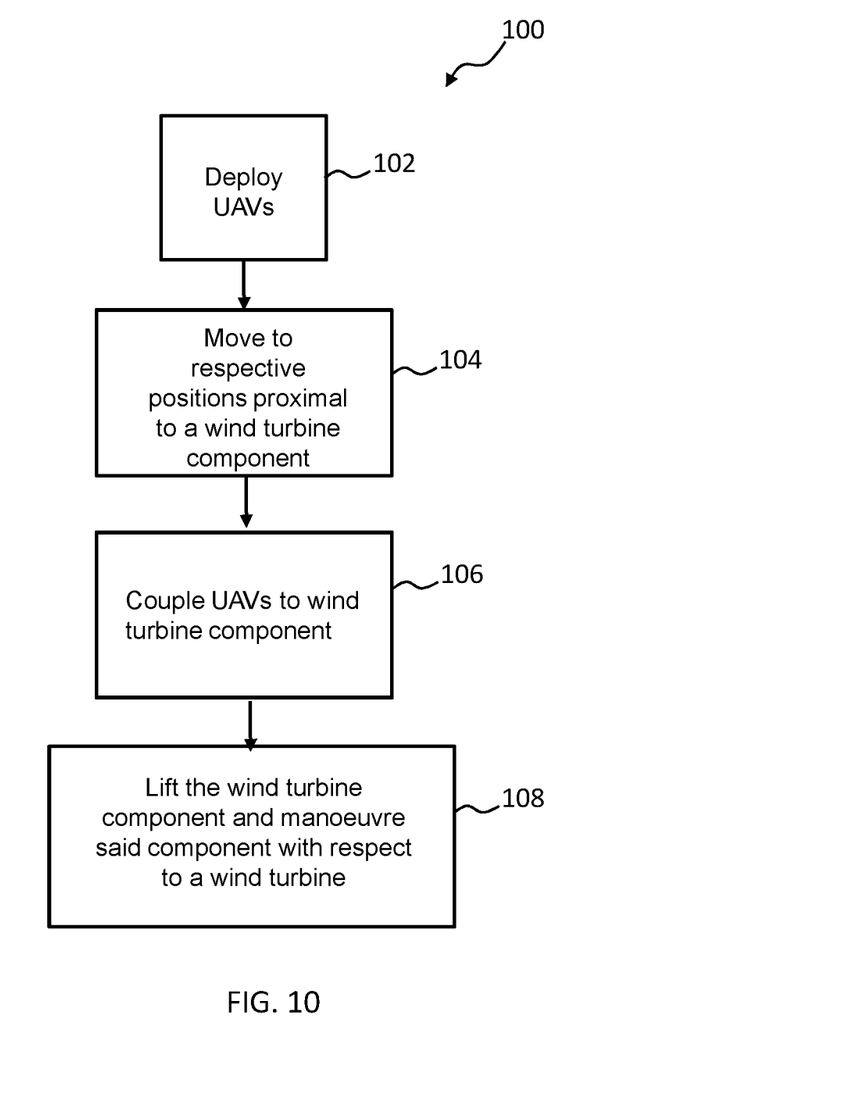
FIG. 10 is a diagram illustrating steps of a method according to an embodiment of the invention.

Referring briefly to FIG. 10, this is a diagram illustrating steps of a method 100 according to an embodiment of the invention in order to handle a component of a wind turbine. Firstly, one or more unmanned air vehicles or drones are deployed 102 from a suitable base, which may be a portable base on a truck or boat. The drones may be deployed in an unconnected configuration or they may be hooked up prior to deployment to a lifting device adapted for lifting the component in question. Once deployed, the drones are commanded and controlled 104 to move to respective positions proximal to a wind turbine component so that the drones can be configured to support that component. Here, the drones adopt fixed airborne stations so that operators are able to couple the drones to whatever component is to be lifted by them. For example a single drone may be connected to a tool package so that it can be lifted and delivered to personnel working in the nacelle of a wind turbine. However, a plurality of drones could be connected to a larger component such as a gearbox or blade. Conveniently the drones would position themselves in a fixed flying formation that is specific to the component that is to be lifted. For example, in the context of a wind turbine blade, a plurality of drones may position themselves in a formation comprising one or more linear arrays aligned with respect to the longitudinal axis of the blade.

Once the drones have been coupled 104 to the wind turbine component, they are then able to be controlled 108 to lift the wind turbine component and manoeuvre said component with respect to a wind turbine. Thus, the wind turbine component can be lifted and positioned conveniently with the use of unmanned air vehicles during assembly and maintenance tasks. In addition to lifting and positioning wind turbine components with respect to a wind turbine so that they can be connected to the wind turbine during assembly, the drones may also be used to lift wind turbine components away from the wind turbine, as may be required during a replacement operation, for example.

The skilled person would appreciate that the specific embodiment discussed here could be modified or adapted in such a way so as not to depart from the inventive concept as defined by the claims. Other variants are also possible.

Figure 11:
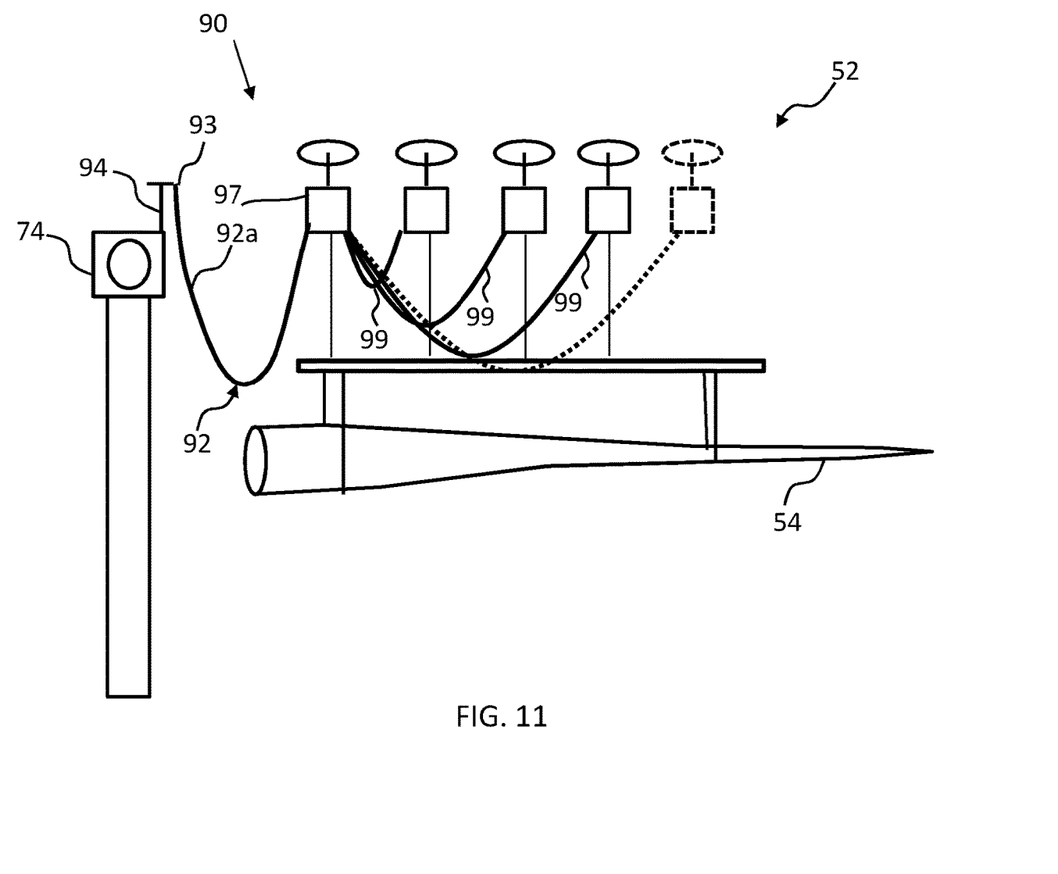
FIG. 11 is a diagram that illustrates further how a wind turbine component can be handled by a plurality of unmanned air vehicles.

One such variant is shown in FIG. 11, which is similar to FIG. 9 such that a first drone provides power to the other drones. The same numbering will be used where appropriate for consistency.

As in FIG. 9, in the embodiment in FIG. 11 a wind turbine blade 54 is being lifted towards the nacelle 74. In order to provide the drone swarm 52 with increased flight time, a tether system 90 is provided. The tether system 90 is configured principally to provide power to the drones in the drone swarm 52 but may also convey data to and from the drone swarm 52 if appropriate.

The tether system 90 comprises umbilicals 92 that provide a power connection to each of the drones. A first umbilical 92a has a first end 93 that connects between a power plug 94 provided on the nacelle and a first one 97 of the drones 52. That first one 97 of the drones provides all the power to the other drones 52 by way of separate secondary umbilicals 99. The 'power supply drone' 97 therefore acts as a power hub and has separate power connections for each drone that needs to be connected to it. Of course, multiple power hub drones may be provided to increase the number of drones that may be supplied with power. This approach means that the first drone may be dedicated to lifting the main umbilical, which will have a substantial mass since it is required to handle the full power supply requirement for a number of drones. The secondary umbilicals that supply power to the other drones can therefore be made much lighter because they only have to supply power to a single one of the drone swarm.

The invention claimed is:

1. A method of handling a wind turbine component for assembly or maintenance, the method comprising:
providing the wind turbine component having a portion of a guidance system located thereon;
moving one or more unmanned air vehicles to respective positions proximal to the wind turbine component so that the wind turbine component can be supported by the one or more unmanned air vehicles;
controlling the one or more unmanned air vehicles to lift the wind turbine component and manoeuvre said wind turbine component with respect to a wind turbine;
guiding the wind turbine component to the wind turbine using the guidance system to communicate a position of the wind turbine component with respect to the wind turbine to the one or more unmanned air vehicles.

2. The method of claim 1, wherein the guidance system is an optical guidance system, a radar-based guidance system or a lidar based guidance system.

3. The method of claim 1, further comprising supporting the wind turbine component with each unmanned air vehicle by way of a respective support line.

4. The method of claim 1, further comprising attaching a pair of unmanned air vehicles to a respective support line.

5. The method of claim 1, wherein each of the unmanned air vehicles is attached to a lifting yoke, which is in turn attached to the component by one or more support lines.

6. The method of claim 3, wherein the support lines are slings that run underneath the component.

7. The method of claim 1, further comprising coordinating positions of the one or more unmanned air vehicles so that the wind turbine component is lifted in a predetermined orientation.

8. The method of claim 7, wherein the one or more unmanned air vehicles include a first master vehicle and one or more slave vehicles, whereby positions of the one or more slave vehicles are coordinated with the first master vehicle.

9. The method of claim 8, wherein the one or more unmanned air vehicles include a secondary master vehicle, whereby the positions of the one or more slave vehicles are distributed between one or more of slave vehicles associated with the first master vehicle and one or more slave vehicles associated with the secondary master vehicle.

10. The method of claim 9, wherein the first master vehicle sends signals to the one or more slave vehicles associated with the first master vehicle to coordinate movement thereof and the secondary master vehicle sends signals to the one or more slave vehicles associated with the secondary master vehicle to coordinate movement thereof.

11. The method of claim 7, wherein the coordinating of the positions of the one or more unmanned air vehicles is based on a differential GPS system.

12. The method of claim 1, wherein the one or more unmanned air vehicles are aligned in a linear array during a lifting manoeuvre.

13. The method of claim 1, wherein the wind turbine component is a wind turbine blade.

14. The method of claim 1, including providing power to the one or more unmanned air vehicles by way of a tether system including at least one umbilical, including supporting the first end of the umbilical on a component of the wind turbine.

15. A system for handling a wind turbine component of a wind turbine, comprising:
a plurality of unmanned air vehicles;
a UAV ground station computer system;
one or more lifting harnesses for carrying by the plurality of unmanned air vehicles; and
the system further comprising a guidance system associated with the wind turbine component, with a portion of the guidance system being located on the wind turbine component, wherein the guidance system is adapted to communicate a position of the wind turbine component with respect to the wind turbine to the one or more of the plurality of unmanned air vehicles in order to guide the wind turbine component towards a target position.

16. The system of claim 15, wherein at least one of the plurality of unmanned air vehicles is configured to implement autonomous flight routines.

17. The system of claim 15, wherein one of the plurality of unmanned air vehicles is designated as a master vehicle, and wherein a plurality of the unmanned air vehicles are designated as slave vehicles, wherein each slave vehicle coordinates its movement with the movement of the master vehicle.

18. The system of claim 15, wherein flight control of the plurality of unmanned air vehicles is based on a differential GPS system.

19. The system of claim 15, wherein the guidance system includes one or more of an optical guidance system, a radar-based guidance system or a lidar based guidance system.

20. The system of claim 15, including a tether system for providing power to the unmanned air vehicles, the tether system including at least one umbilical having a first end connected to a power supply, wherein the first end of the umbilical is supported on a component of the wind turbine.

21. The system of claim 15, wherein the plurality of unmanned air vehicles are electrically powered.

22. The method of claim 1, further comprising maintaining a position of the wind turbine component relative to the wind turbine for attachment of the wind turbine component to the wind turbine.

23. The method of claim 5, wherein the lifting yoke includes a sensor to detect the orientation of the lifting yoke.

* * * * *